June 3, 1969    R. J. PORTER    3,447,810
SHAFT SEALS
Filed Oct. 7, 1965

INVENTOR.
ROBERT J. PORTER
BY *Watts & Fisher*
ATTORNEYS.

United States Patent Office 3,447,810
Patented June 3, 1969

3,447,810
SHAFT SEALS
Robert J. Porter, Mansfield, Ohio, assignor to The
Gorman-Rupp Company
Filed Oct. 7, 1965, Ser. No. 493,675
Int. Cl. F16j 15/36, 15/38, 15/34
U.S. Cl. 277—85                                    4 Claims

ABSTRACT OF THE DISCLOSURE

In a face-type shaft seal, a seat including a seat body mounted by a surrounding, resiliently flexible ring for tilting movement and for compound floating movement in circumferential, radial and axial directions, and a seal ring resiliently mounted in the seat body for radial and axial floating movement relative to the body.

---

Figure 1:
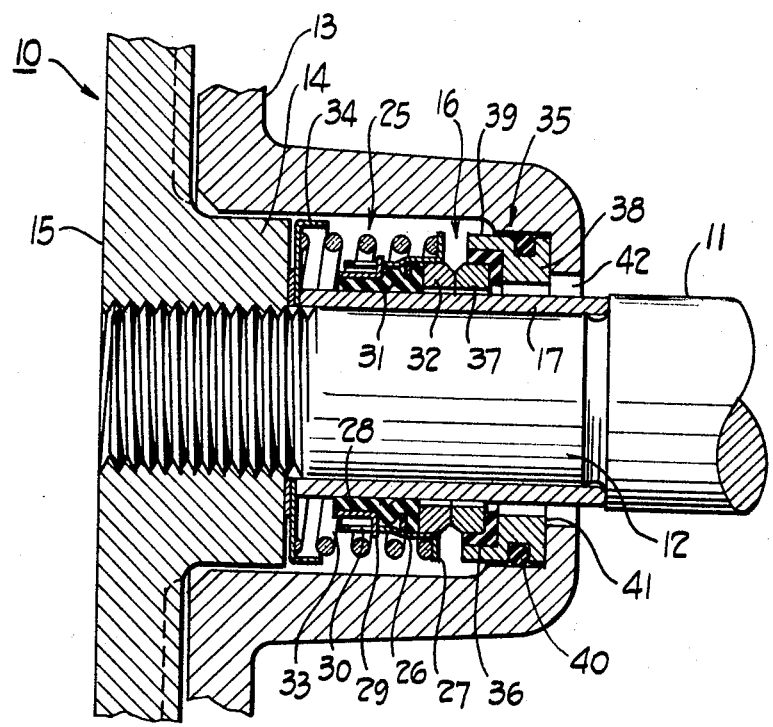

This invention relates generally to mechanical shaft seals, and more spsecifically to a new floating, shock-absorbing and self-aligning face-type shaft seal assembly especially suited for use in pumps.

Pumps and similar equipment which include rotating shafts have been provided with seals of various types to prevent leakage along the shafts. One conventional type of seal is known as a face seal. A typical face seal comprises a rotating assembly which includes a ring equipped with a radial sealing face and an O-ring or other sealing element that forms a static seal between the ring and the rotatable shaft. The seal face of the rotating assembly cooperates with a mating seal face provided by a stationary seat member which also surrounds the shaft. In normal operation the seal faces of the rotating assembly and the seat are maintained in engagement by a coil spring or the like which surrounds the shaft and urges the rotating assembly toward the seat.

The seat constructions employed in shaft seal assemblies as described above have been in different forms. One construction is known as an O-ring type seat and is comprised of a metal ring which has an end surface that acts as the seal face. An O-ring is mounted in a peripheral groove formed midway between the ends of the seat ring and serves as a seal between the seat and the component part in which it is installed. Another conventional construction is known as a cup-type seat. It consists of a rubber cup ring which is L-shaped in cross-section and carries a separate sealing ring formed of metal or other suitable material that bears against the seal face of the rotating assembly. In a typical pump installation, the assembly of the rubber cup ring and the sealing ring has been fitted into a component part of the pump, such as the seal housing.

The above-described shaft seal assemblies embodying the known types of seat constructions are short-lived when subjected to the severe operating conditions of equipment such as centrifugal pumps and must be frequently replaced. A primary cause of seal failures in centrifugal pumps is believed to be cavitation. Cavitation produces severe hydraulic shocks which are transmitted through the incompressible liquid to all parts of the pump, including the shaft seal. These shocks cause impacting or "chattering" of the rotating seal face element against the stationary seal face at a frequency which is equal to the number of vanes in the impeller used times its speed of rotation. For example, in a typical centrifugal pump having a two-vane impeller, the frequency of cavitation and consequent chattering of the rotating seal face may be 60 times a second or higher. At the same time, cavitation in centrifugal pumps causes radial deflections of the impeller and its shaft which, in turn, tend to force the rotating seal face radially across the stationary face.

Thus, the rotating face experiences a compound movement due to cavitation which is both axial and radial relative to the stationary seal seat. During this compound movement, the severe hydraulic shock waves produced by cavitation cause the rotating face momentarily to seize on the stationary face with such force that amounts of material are removed from both faces until the seal has been destroyed.

The foregoing effects of cavitation on conventional shaft seals are evidenced by the formation of striations and chatter marks on both seal faces. These formations can occur within a relatively few hours of pump operation and result in leakage of oil from the seal cavity, thereby requiring the pump to be shut down and the seal to be replaced.

Hydraulic shock and severe shaft deflections, vibrations and axial or radial movement may also cause misalignment and consequent separation of the sealing faces of conventional shaft seals. When separation occurs, abrasive material often enters the space between the seal faces and causes extreme wear and rapid deterioration of the assembly. Even in the absence of grit or other abrasive material, misalignment of the seal faces may result in uneven wear and in only partial contact of the faces, thereby reducing the effectiveness of the seal.

The present invention pertains to shaft seals such as generally described above and provides a new construction which overcomes the problems encountered in pump installations. The invention particularly resides in a novel seal seat structure having new floating, shock-absorbing and seal face aligning characteristics which eliminate chattering of the seal elements due to pump cavitation and consequent scoring and removal of metal from the seal faces. Shaft seals embodying the new seat are long-lived and have an advantageous sealing action which cannot be obtained with seal seats of the prior art.

As contemplated in the preferred embodiment of the invention, the new seal seat comprises a non-rotating seal ring which is nested in a resiliently flexible cup. The resilient cup is fitted in a seal seat body so as to permit floating movement of the seal ring. The seat body is, in turn, mounted for floating movement in a seal housing by another resiliently flexible member. Of particularly importance to the performance of the new construction are the combined effects of the resilient, flexible mounting of the seal ring and the resilient, flexible mounting of the seat body.

A shaft seal incorporating the new seat may be accurately described as a double-floating, shock absorbing, self-aligning construction. The resiliently flexible cup which carries the non-rotating seal ring provides a first floating and shock absorbing action which cushions the seal ring while allowing it to follow and bear against the rotating seal ring. More specifically, the resilient cup cushions the stationary seal ring and allows it to move axially in response to corresponding movement of the rotating seal ring which is caused by the shock waves resulting from cavitation. This cushioned movement of the stationary seal ring attenuates the greatly increased pressures which the rotating seal ring tends to exert on the stationary ring when pump cavitation occurs and thereby reduces the tendency of the rotating ring to seize on the stationary ring and remove metal from both seal faces. At the same time, the resilient cup permits the stationary ring to move radially in the seal seat body and to follow radial movements of the rotating ring produced by shaft deflections, vibrations and the like. The compound movements of the stationary ring which are afforded by the cup are complemented by the resilient mounting of the seal seat body itself within the seal housing. The resilient flexible mounting of the seat body also affords a cushioning action and permits the body to float and creep annularly in the housing in response to the shocking forces and radial movement of the rotating ring against the stationary ring.

Thus, the combined effects of the resilient cup and the resilient mounting of the seat body are to cushion the hydraulic shock forces of the rotating ring produced by pump cavitation and to prevent chattering of the seal elements. Both features also cooperate to provide a double floating action of the seal seat which assures alignment of the seal faces by permitting the stationary ring to follow and constantly bear against the rotating ring.

The shock absorbing, double-floating and self-aligning characteristics of the new seat which assure cushioned, firm engagement of the seal rings result in a long-lived, maintenance-free shaft seal. Among other advantages, the new seat can be easily incorporated into all types of mechanical shaft seals commonly used in pumps and is applicable to all standard seal sizes and construction materials. Thus, the novel features of the invention provide many advantages which can be obtained in a broad range of equipment and usage.

In one construction contemplated by this invention, the seal seat body is resiliently and flexibly mounted in the seal housing of the pump by an annular member, such as an O-ring, which surrounds the seat body. This O-ring is positioned between transverse planes located by the base of the resilient cup in which the stationary seal ring resides and the end of the seat body remote from the cup. The positioning of the O-ring at a location which is axially spaced from the resilient cup is believed to enhance the floating action that maintains the seal faces in engagement. When severe torsional or cocking forces are imposed on the seat body through the cup by the rotating seal ring, the seat body can move about the O-ring and assume a position in which its longitudinal axis is skew with respect to the axis of the shaft. In this manner, the axially off-set location of the O-ring cooperates with the resilient cup to maintain the two seal rings in self-aligned engagement under severe conditions of shaft deflection which cannot be accommodated by conventional seals.

Other important features and advantages of the new seat of this invention are that it can be easily removed and installed in a pump and that a complete seal embodying the new seat can be tested for leakage before installation. The seat body, the resilient cup and the stationary seal ring which make up the seat can be preassembled in the factory, shipped to the user and installed as a unit in an existing pump. It has been found that it is much easier to mount the pre-assembled seat unit in a seal housing by means of a rubber O-ring or the like than it is to install the conventional seats directly in the housing. Concomitantly, the seat is easier to remove from the housing than conventional seats. The preassembled construction of the seat unit is also such that it can be bench tested for leakage before shipping to the user, thus assuring satisfactory performance when the seat is installed.

Still other features and advantages and a fuller understanding of the invention will be had by reference to the accompanying drawing and the following detailed description.

Figure 2:
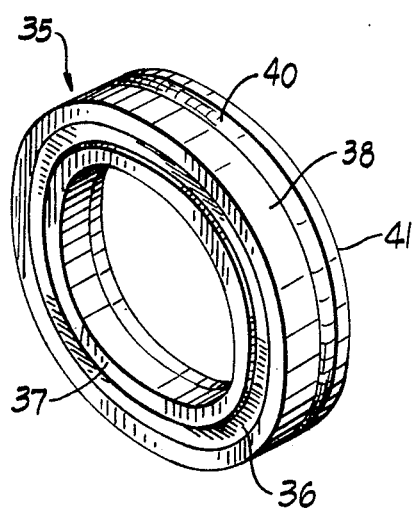

In the drawing:

FIGURE 1 is a cross-sectional view illustrating the new seal provided by this invention; and FIGURE 2 is an elevational view of the new seat which is embodied in the seal.

Referring now to the drawing, there is shown a portion of a centrifugal pump 10 which includes a rotatable shaft 11. As illustrated, the shaft 11 has a reduced end portion 12 which extends through a stationary seal housing 13 into threaded engagement with a hub 14 of an impeller 15. The shaft seal of this invention is generally designated by reference numeral 16 and is mounted in the seal housing 13 around a sleeve 17. The sleeve 17 is engaged on the end portion 12 and forms a part of the shaft 11.

The face-type shaft seal 16 is comprised of a rotating assembly 25 and a stationary seat 35. In the arrangement shown, the rotating assembly 25 is of conventional construction and includes a metal sleeve 26 having a radial flange 27 at one end. A metal ring 28 is disposed in the opposite end of the sleeve 26 and is provided with radial tabs 29 which project into axially extending slots 30 formed in the sleeve. The two-part assembly consisting of the relatively movable members 26, 28 carries a static, shaft sealing element 31 in the form of a flexible tube or bellows which is of sufficient length to permit axial movement of the sleeve 26 relative to the ring 28 toward the seat 35. A seal ring 32, such as an abrasion-resistant metal ring, is carried in the end of the sleeve 26 opposite the ring 28. The seal ring 32 is pressed against the seat 35 by movement of the sleeve 26 under the action of a coil spring 33 which is disposed between the flange 27 and a retainer cup 34.

The seat 35 of this invention comprises a 90° cup 36 formed of a resiliently flexible material, such as rubber, Neoprene or the like. A seal ring 37, which may be an abrasion-resistant metal ring similar to the cooperating seal ring 32, is carried in the open end of the 90° cup 36. The cup 36 is in turn nested into a recess formed in an end of an annular seal seat body 38 so that the cup is surrounded by a lip 39 of the seat body. The seat body 38 is fitted into the seal housing 13 and is retained in place by an annular, resiliently flexible member 40 which surrounds a portion of the body. The member 40 may be an O-ring or the like which is carried in a peripheral groove formed in the seat body.

As shown in the drawing, the annular mounting member 40 is axially off-set from the cup 36. That is, the member 40 is positioned between transverse planes locating the base of the cup and the end of the seat body designated by reference numeral 41. A preferred location of the O-ring is between a transverse plane passing through the center of the seat body 38 and its end 41 opposite to the seal ring 37.

The seat members 36, 37 and 38 can be advantageously preassembled and installed as a unit in the housing 13. During installation, the annular mounting member 40 is simply placed in the groove around the body 38 and the body pressed into position in the housing adjacent its end wall. If it becomes necesssary to remove the seat, this can be done simply and easily by pressing axially on the end 41 of the body 38 through the space 42 between the end wall of the housing and the shaft. The convenient accessibility and ease of both installing and removing the new seat will be apparent by comparing it to a well-known shaft seal of the prior art. That seal includes a bearing mounted on the shaft and held in a fixed axial position by clamping rings. The bearing was located in the bearing housing and was clamped against a bearing end cap. An O-ring type seat was also mounted in the housing against a shoulder at the end of the housing opposite to the cap. In order to replace the seat, it was necessary to remove the bearing end cap and the bearing which was both difficult and time-consuming. The use of this invention materially reduces down-time which has been a major item in pump applications.

As previously mentioned, another advantage of the invention is that the pre-assembled seat unit can be tested for leakage before installation in a pump. A typical arrangement which has been used to test the seat includes a rubber mat on which the end 41 of the seat body 38 is placed. An assembly similar to that designated by reference numeral 25 is positioned above the seat so that the compression spring urges the two seal rings into engagement. A plug is inserted into the tube 31 and liquid at a predetermined pressure is introduced into the confines of the seal assembly. In this manner the seal can be checked for leakage under the same conditions which are expected to obtain during actual use.

When the new seal has been installed in a pump such as indicated at 10 and the pump is in operation, it will be understood that the liquid being handled enters the seal housing 13 through the space behind the impeller 15 and fills the housing around the seal 16. This liquid in the seal housing is prevented from leaking along the shaft 11 toward the shaft bearings (not shown) by the static seal element 31 and by the seal rings 32, 37. As in conventional face-type shaft seals, the sleeve 26 of the rotating assembly 25 is urged toward the seat 35 by the coil spring 33 to place the rotating seal ring 32 in aligned sealing engagement with the non-rotating seal ring 37.

Since the ring 32 rotates against the ring 37, it is necessary to provide lubricant between the rings. In the usual pump construction, the seal housing 13 is located within a bearing housing (not shown) which forms a part of the pump and defines a lubricant chamber that is normally filled with oil. The oil flows into the seal housing 13 around the shaft 11 through the annular space indicated by reference numeral 42 and serves to lubricate the mating faces of the seal rings 32, 37.

As generally explained above, the occurrence of cavitation within the volute (not shown) of the pump 10 around the impeller 15 produces hydraulic shocks which are transmitted at high frequencies through the liquid in the seal housing 13 to the seal assembly 16. These shock waves force the rotating assembly 25 toward the seat 35 and, in conventional seals, cause impacting or chattering of the rotating seal against the stationary ring. The impact pressures caused by cavitation are substantial. For example, it has been shown that cavitation in water produces impact pressures of approximately 80,000 p.s.i. With conventional seals these pressures are sufficient to cause the rotating ring to seize on the stationary ring so that metal is removed from both seal faces to form striations or grooves which destroy the lapped finish of the faces.

Cavitation in the volute of the pump 10 also imposes radial thrusts on the impeller 15 and its shaft 11 which tend to cause the ring 32 to move radially across the face of the ring 37. In conventional seals, the compound axial and radial movements of the ring 32 which are caused by cavitation result in striations or grooving which extend across the seal faces from the inside edges of the rings to the outside edges. When these striations are formed on the seal faces, the oil in the lubricant chamber is sucked past the rings, through the seal housing and into the volute. In the absence of the lubricant, the seal rings run dry and complete failure of the seal quickly results.

With the seal of this invention, the cup 36 cushions the hydraulic shock forces imposed by the ring 32 on the ring 37. The cushioning or shock-absorbing action attenuates the shock forces to such a degree that the ring 32 is prevented from seizing on the ring 37. At the same time, the cup 36 allows the ring 37 to move radially and to follow the ring 32, thereby maintaining the rings in sealing engagement and preventing the ring 32 from moving across the face of the ring 37. This cushioning and floating action afforded by the cup is supplemented by the resilient mounting of the seat body 38 which allows the seat body to float in the seal housing 13. It is believed that the annular member 40 also allows the seat to creep annularly in the housing 13 and that this movement further reduces the tendency for the ring 32 to seize on the ring 37. The resulting double-floating and shock-absorbing actions prevent chattering and deterioration of the seal faces and maintain the two rings in self-aligned relationship.

It is believed that the illustrated location of the ring 40 between the cup 36 and the end 41 of the seat body may improve the floating action of the body in applications involving severe shaft deflections. When the ring 32 tends to cock because of shaft deflections or the like, it exerts unequal forces on diametrically opposed portions of the face of the ring 37, and these unequal forces are transmitted into the cup 36 and cause the resiliently flexible material of the cup to distort within the confines of the lip 39. The unequal forces transmitted into the cup 36 are in turn exerted on the seat body 38 because of the lip 39 which surrounds and confines the cup.

The location of the ring 40 in an axially off-set position from the cup 36 forms an effective lever arm extending to the engaged faces of the rings 32, 37 which is longer than the distance between the O-ring and the end 41 of the body opposite to the seal rings. When the cup 36 can no longer accommodate movement of the ring 37, the unequal forces cock the seat body about the O-ring 40. Because of the location of the O-ring and the long lever arm which it provides, the entire seat 35 is able to float as a unit and tilt in the housing 13 so that the axis of the seat body is skew to the shaft 10, thereby maintaining the seal rings in engagement under conditions which cannot be accommodated by the shaft seals of the prior art.

The unexpected sealing action and the resulting long life of the new seal cannot be obtained with seals embodying the seats of the prior art. One exemplary installation in which the new seal has been used successfully was a centrifugal pump employed in a sewage treatment digester system. This pump was installed with a conventional face type shaft seal comprised of an annular seat body mounted in the seal housing of the pump and an O-ring which served as a sealer between the housing and the body. The seat body carried a stationary seal ring, but did not include a resilient mounting cup for the ring. The rotating assembly of the seal comprised a sleeve around the shaft, a compression spring for urging the sleeve toward the seat and a seal ring which mated with the stationary seal ring.

The foregoing seal failed after 45 days of operation. It was then replaced with a seal of a type comprised of a rotating seal ring mounted on the shaft and a non-rotating ring which also surrounded the shaft and was pressed against the rotating ring by a compression spring. This seal failed after 41 days of use. It was replaced with a similar seal which failed after 31 days and then with another seal of the same construction which failed after only 8 days. Still another seal of the same construction was installed and it failed after 25 days.

The sixth seal used in the pump was similar to the previously described replacement seal except that the rotating ring was seated in an annular body mounted for rotation with the shaft and an O-ring was placed between the ring and the surrounding wall of the body. This seal failed after 52 days of pump operation. The next replacement seal comprised an annular seat body mounted in the seal housing by a surrounding O-ring and a rotating assembly similar to that shown in the drawings. The rotating assembly carried a Carboloy face seal ring which engaged a nickel alloy seat ring. After three days, the seal had failed and the carbon ring was completely worn out.

A seal constructed according to this invention was then installed in the same pump. At the time of installation, the pump bearings were rough and noisy, but the bad bearings were left in the pump in order to test the seal under severe operating conditions. The seal has been in continuous operation for over 280 days without replacing the pump bearings and to date there has been no indication of failure and no leakage in the pump.

Another example of successful use was in a centrifugal pump employed in a potato fluming process. Over a period of approximately eight weeks, four seals were used in this pump of the type including an annular body mounted on the shaft for rotation and a seal ring fitted into the body and sealed by an O-ring. The cooperating stationary ring was carried by a sleeve which was urged toward the rotating ring by a compression spring. Each seal failed after about two weeks of operation. The new seal of this invention was then installed and has been in continuous use without any changes for approximately 256 days.

Another pump used in a potato fluming process was installed with a seal comprised of a seat body which was mounted in the seal housing by an O-ring and carried a stationary ring. The rotating assembly comprised an axially movable sleeve which was provided with a mating seal ring. The seal lasted for approximately 500 hours and was replaced by a seal of the same construction which failed after less than 576 hours. It was replaced by a seal of the same type which lasted for about 285 hours and by still another seal which lasted for the same period. The seal of this invention was installed and has been in operation for over six months or 4000 hours without any signs of failure.

Many modifications and variations of the invention will be apparent to those skilled in the art in view of the foregoing detailed disclosure. Therefore, it is to be understood that, within the scope of the appended claims, the invention can be practiced otherwise than as specifically shown and described.

What is claimed is:

1. In combination:
   (a) a housing which defines a chamber;
   (b) a rotatable shaft structure extending into said housing;
   (c) a seat body having first and second ends, an outer peripheral surface, and an L-shaped recess having a side wall defined by an axially projecting lip of said body and a bottom wall extending radially inwardly from said lip, the end of said recess opposite to said bottom wall being open on said first end of said body, and the side of said recess opposite to said lip being open on the radially inner side of said body;
   (d) said seat body being surrounded by a wall of said housing and radially spaced therefrom so that said seat body can tilt relative to said housing;
   (e) said seat body being free to move longitudinally relative to said housing into said chamber;
   (f) means mounting said seat body within said surrounding wall of said housing for compound floating movement in directions circumferentially, radially and longitudinally of said shaft structure and for permitting said seat body to tilt at a skew angle relative to said shaft structure, said mounting means comprising a resiliently flexible ring surrounding said seat body and engaged between said body and said surrounding wall of said housing;
   (g) a seal ring carried by said body and presenting a first annular seal face surrounding said shaft structure;
   (h) resiliently flexible means engaged between said seal ring and said side wall and said bottom wall of said recess for permitting said ring to move radially and longitudinally relative to said seat body; and
   (i) an assembly mounted for rotative and axial movement on said shaft structure, said assembly including means providing a second annular seal face surrounding said shaft structure, means providing a fluid seal with said shaft structure, and means urging said second annular seal face into engagement with said first annular seal face to form a fluid-tight, cushioned dynamic seal around said shaft structure.

2. The combination as claimed in claim 1 wherein said resiliently flexible means comprises an L-shaped cup fitted into said L-shaped recess.

3. The combination as claimed in claim wherein said resiliently flexible ring is an O-ring.

4. The combination as claimed in claim 3 wherein said O-ring is positioned between planes located by said bottom wall of said recess and by said second end of said seat body.

References Cited

UNITED STATES PATENTS

| 2,989,966 | 1/1961 | Marshall | 277—81 X |
| 2,884,268 | 4/1959 | Amirault et al. | 277—83 |

SAMUEL ROTHBERG, *Primary Examiner.*

U.S. Cl. X.R.

277—92